Figure 1:
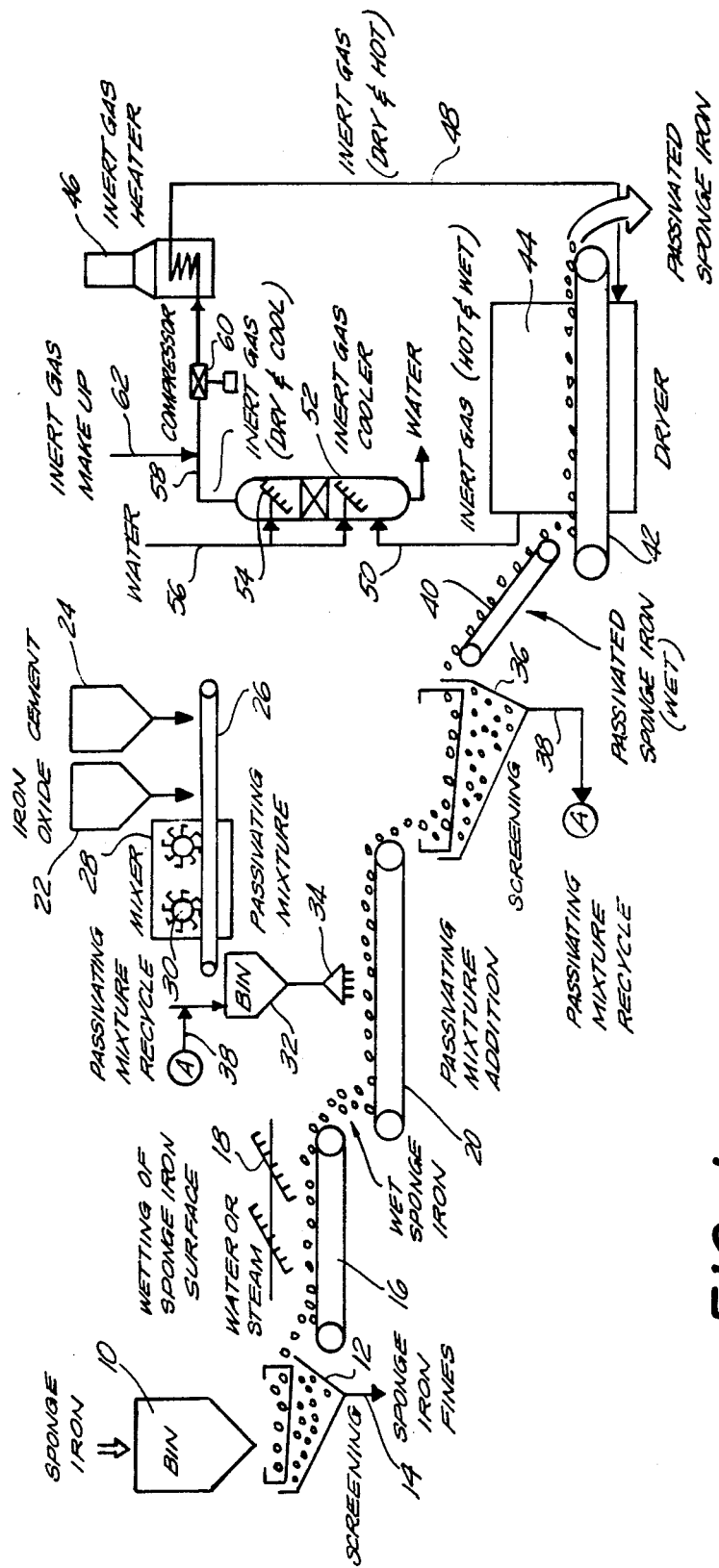

106-89
6/14/83   AU 113   EX
XR   4,388,116

United States Patent [19]
Carrillo-Cantu et al.

[11]  4,388,116
[45]  Jun. 14, 1983

[54] PASSIVATION OF SPONGE IRON

[75] Inventors: David H. Carrillo-Cantu; Asdrubal Treviño-Alanis, both of Monterrey, Mexico

[73] Assignee: Hylsa, S.A., Monterrey, Mexico

[21] Appl. No.: 289,999

[22] Filed: Aug. 4, 1981

[51] Int. Cl.³ .............................. C04B 7/22
[52] U.S. Cl. ........................ 106/97; 75/0.5 R;
   75/0.5 AA; 75/0.5 BA; 75/256; 427/242;
   428/403; 428/404; 428/469; 428/471; 106/89
[58] Field of Search ......... 75/0.5 R, 0.5 AA, 0.5 BA,
   75/256; 427/216, 242; 428/403, 404, 469, 471;
   106/89, 97

[56]  References Cited
U.S. PATENT DOCUMENTS 4,030,913  6/1977  Wegener .................. 75/0.5 R
4,069,015  1/1978  Ahrendt et al. ............ 75/0.5 R
4,254,167  3/1981  Sulzbacher et al. .......... 427/242

FOREIGN PATENT DOCUMENTS 2003057  3/1979  United Kingdom .

Primary Examiner—W. Stallard
Attorney, Agent, or Firm—Curtis, Morris & Safford

[57]  ABSTRACT

Sponge iron pellets are protected against re-oxidation by pre-wetting them with water or steam, coating them with a pulverulent passivating agent which is a mixture of iron oxide particles and hydraulic cement particles, then drying the treated pellets. Especially good results are achieved by using a hydraulic cement such as Portland cement and an iron oxide/cement ratio of 40:60 to 70:30.

18 Claims, 2 Drawing Figures

PASSIVATION OF SPONGE IRON

This invention relates to sponge iron and more particularly to a novel and improved method of passivating sponge iron, i.e., protecting it against re-oxidation during storage and/or transportation.

Sponge iron is commonly produced by the direct reduction of iron ore with a reducing gas, typically a gaseous mixture rich in carbon monoxide and hydrogen, at elevated temperatures of, e.g., 750° to 1100° C. As thus produced, sponge iron is usually in the form of highly porous pellets which typically contain above 70% by weight of elemental iron. Because of their porosity, sponge iron pellets have a large total surface area and thus tend to reoxidize when stored in the open atmosphere, especially when they are discharged from the reduction reactor at temperatures significantly above ambient temperatures. Since, this reoxidation is exothermic and the rate of heat dissipation from the sponge iron is lower than the rate of heat generation by the re-oxidation reaction, there will be a cumulative increase in temperature as a function of time. This condition creates so-called "hot-spots" in the sponge iron the temperature of which may even reach ignition temperatures. This is particularly dangerous if the sponge iron is to be stored or transported to another location in a suitable transport vessel. Also, to the extent that such re-oxidation occurs, a greater load is imposed on the subsequent steel-making process and the energy required to produce a given quantity of steel from the sponge iron is increased.

Numerous processes have been previously proposed for inhibiting or preventing such re-oxidation of the sponge iron. Thus, it has been suggested that the sponge iron be re-oxidized to a limited extent by exposure to a gaseous atmosphere comprising an inert gas containing a small controlled amount of oxygen or a oxygen-containing gas. Such processes are disclosed, for example, in U.S. Pat. Nos. 3,479,232; 3,549,425; 3,551,215; 3,615,340; 3,617,394; 3,704,088, and 3,723,059. Various liquid treating agents, both organic and inorganic, have been proposed. Thus, the use of organic liquids is disclosed in U.S. Pat. Nos. 3,520,676 and 4,030,913. Treatment with inorganic solutions is disclosed in U.S. Pat. Nos. 2,527,611 (aqueous nitric acid) and 4,069,015 (aqueous silicates). Treatment with dry ice is shown in U.S. Pat. Nos. 3,276,921 and 3,480,425.

Another approach that has been suggested involves the application of a protective coating to the sponge iron pellets, which coating may be continuous as in the processes wherein the pellets are encased in, e.g., a plastic coating, or discontinuous as in the case where the pellets are treated with a pulverulent material to protect them against oxidation. Wenzel and Gudenau in an article entitled "Rückoxydationsschutz fur Eisenschwammpellets", Aufbereitungs-Technik, Nr. 12 (1969) pages 705 to 712, describe experiments wherein the treating agents used included liquid collodion and cement powder, as well as light oil and aqueous caustic. French patent No. 2,401,227 describes a process wherein sponge iron pellets are treated with calcium oxide powder and a small amount of iron oxide powder to improve the adherence of the calcium oxide powder to the pellets.

The previously proposed methods of inhibiting or preventing re-oxidation of sponge iron pellets are open to one or more of a number of objections. Liquid treating agents tend to penetrate the pores of the sponge iron and thereby introduce contaminates into the steel furnace to which the sponge iron is charged. In the case of the inhibitary coating processes, the coating material may have a deleterious effect on the steel-making process. In general, such processes either fail to provide adequate protection against re-oxidation or introduce undesired contaminant into the steel furnace or both.

It is accordingly an object of the present invention to provide an improved process for treating sponge iron pellets to inhibit their tendency to re-oxidize when exposed to the atmosphere. It is another object of the invention to provide such a process wherein a material is used to treat the sponge iron, which material is innocuous in a steel-making process to which the treated sponge iron is charged. It is a further object of the invention to provide an inexpensive and effective method of inhibiting the re-oxidation of sponge iron pellets. Other objects of the invention will be in part obvious and in part pointed out hereafter.

In one of its aspects the present invention is a method for passivating sponge iron pellets which comprises the steps of wetting the pellets, applying to the wetted pellets a passivating amount of a pulverulent mixture of hydraulic cement particles and iron oxide particles and drying the thus treated pellets. While any of a variety of hydraulic cements can be used, it has been found that good results can be obtained when using conventional and well-known Portland cement. Such cements may consist essentially of a major amount of calcium oxide and minor but substantial amounts of silicon dioxide and aluminum oxide. Typical hydraulic cements may comprise by weight 60 to 67% calcium oxide, 19 to 24% silicon dioxide, 4 to 9% aluminum oxide, up to 5% magnesium oxide, up to 3% sulfur trioxide and 1.6 to 6.0% ferric oxide. The particle size of the cement used does not appear to be particularly critical. Good results have been achieved with cements having average particle sizes within the range 0.02 to 0.05 mm.

In general, the quantity of iron oxide powder used should be sufficient to promote acceptable adhesion of the cement powder to the pre-wetted pellets and may vary over a rather wide range. As will be more fully pointed out hereafter, it has been found that improved protection against re-oxidation can be achieved by using a rather substantial amount of the iron oxide powder, e.g., 50% by weight, in the pulverulent mixture. Data supporting this finding are discussed below. The particle size of the iron oxide powder used may be of the same order of magnitude as that of the cement powder, e.g. 0.02 to 0.05 mm.

The weight ratio of pulverulent passivating agent to sponge iron pellets can also be varied over a rather wide range. It is usually desirable to apply a relatively thin layer of the passivating agent to the sponge iron pellets, both for reasons of economy and because thick coatings appear to have a tendency to crack and open up fissures exposing the pellet surface to the atmosphere. Desirably the pulverulent passivating agent should comprise from about 0.1 to 1.0% by weight of the coated pellets. It should be noted that even if the maximum amount of said passivating agent is used, i.e. 1%, and if it contains up to 3% $SO_3$, this would result in approximately 0.01% additional sulphur in the sponge iron which would not have a detrimental effect in the steel making process.

The pre-wetting and drying of the sponge iron pellets are described below. In general the pellets can be pre-wetted with either water or steam. Drying can be effected with a heated inert gas.

In one of its other aspects the present invention may be considered to be an improvement of the process disclosed in French patent No. 2,401,227 referred to above. The present process differs from that of the French patent in that it employs a hydraulic cement rather than calcium oxide. Also, the French patent fails to teach the use of a relatively large amount of iron oxide in the passivating mixture, e.g., 40% to 70% by weight, which has been found to be advantageous. It has further been found that the use of 50% to 60% by weight of iron oxide in the passivating mixture is particularly effective. Data evidencing the practical significance of these differences are discussed below.

Figure 2:
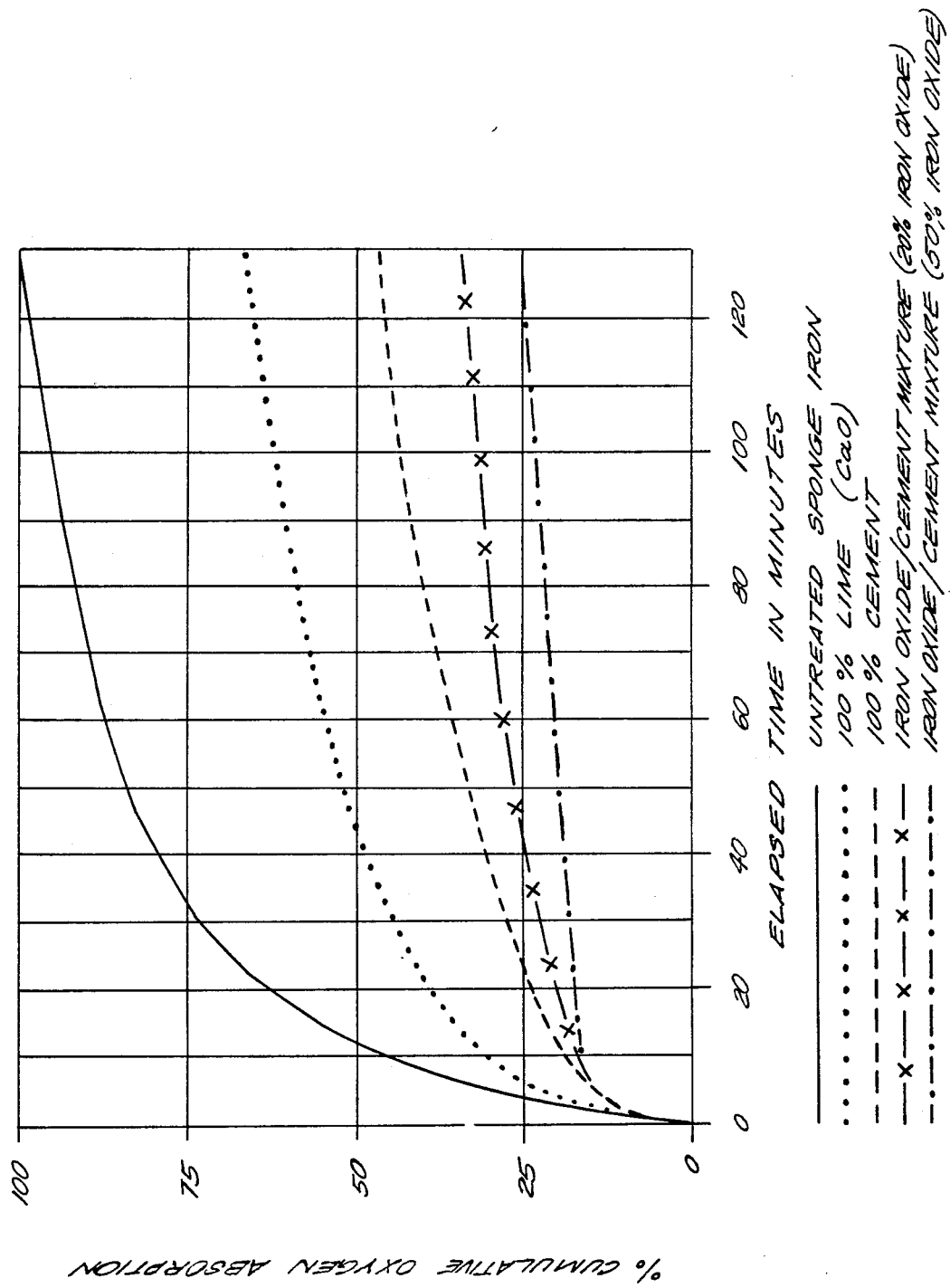

The many objects and advantages of the present invention can best be understood and appreciated by reference to the accompanying drawings wherein:

FIG. 1 is a flow sheet illustrating apparatus capable of being used to cary out the process of the invention; and FIG. 2 comprises a series of curves illustrating the comparative effectiveness of the passivating mixture of the present invention and that of a number of other materials and mixtures.

Referring to the drawings and more particularly to FIG. 1 in the illustrative system there shown sponge iron to be passivated flows from a storage bin 10 to a vibratory screen 12 where sponge iron fines are separated and removed through a conduit 14. The screened particles have a particle size of say 8 to 15 mm. and pass to a conveyor 16 where the particle surfaces are wetted with water or steam supplied through the spray heads 18 and thence to a conveyor 20. The components of the passivating mixture, i.e. particulate iron oxide and cement are stored in the bins 22 and 24 respectively from which they flow in the desired proportions to a conveyor 26 on which they pass through a mixing chamber 28. Within the chamber 28 the iron oxide and cement powders are mixed by the mixers 30 and thereafter the mixture is delivered to a bin 32 from which it flows to a distributing head 34 that spreads it over the layer of sponge iron pellets on the conveyor 20.

From conveyor 20 the treated sponge iron pellets flow to a vibratory screen 36 where excess passivating agent is separated and returned through the conduit 38 to the bin 32. The wet passivated sponge iron pellets are carried via a conveyor 40 to conveyor 42 and thence into a drying chamber 44 wherein they are dried.

Drying of the treated pellets is effected by means of a heated inert gas, e.g. nitrogen, which is circulated through the drying chamber 44. Heating of the gas is effected in a heater 46 and the hot gas flows through the conduit 48 to the lower portion of chamber 44 and thence upwardly through the bed of treated sponge iron on conveyor 42. Moist gas leaves chamber 44 through a conduit 50 and flows to a spray cooler 52 wherein it is cooled and dewatered by sprays 54 supplied with water by a conduit 56.

Effluent gas from cooler 52 flows through conduit 58 to a compressor 60 and thence back to the heater 46 to form a drying gas loop. Make-up gas is supplied to the loop through a supply conduit 62. The dried, passivated sponge iron pellets leaving dryer 44 on conveyor 42 are conducted to a suitable point of storage. (not shown).

Turning now to FIG. 2 of the drawings, as indicated above this Figure comprises a family of curves recording the results of comparative tests made on sponge iron pellets treated with the passivating agent of the present invention and with certain other passivating agents. In carrying out these tests a predetermined quantity of treated pellets, specifically one kilogram, was placed in a closed chamber and a stream of air heated to 150° C. was caused to flow through the mass of pellets. A flow of 60 liters of air per hour (referred to 0° C. and atmospheric pressure) was heated and passed through the one kg. sample for a period of 130 minutes. The oxygen content of the effluent gas was measured and the cumulative absorption of oxygen by the sample determined as a percentage of the oxygen absorption of an unpassivated sample. In FIG. 2 this percent cumulative oxygen absorption is plotted against time. These curves show that by using a mixture of iron oxide and cement as a passivating agent a relatively high degree of passivation is achieved.

From the foregoing description it should be apparent that the passivating agent and method of passivation of the present invention provides more effective passivation of sponge iron pellets than can be achieved by the passivating agents and methods proposed in the prior art. By using cement in place of the lime disclosed by the French patentee and particularly by employing a relatively high proportion of iron oxide a substantial improvement in passivation is obtained. It is of course to be understood that the foregoing description is intended to be illustrative only and that numerous changes can be made in the specific materials, proportions and conditions disclosed without departing from the spirit of the invention as defined in the appended claims.

We claim:

1. A method of passivating sponge iron pellets comprising the steps of wetting said sponge iron pellets, applying to the wetted pellets a passivating amount of a pulverulent mixture of about 40% to 70% by weight of iron oxide particles and about 60% to 30% by weight of hydraulic cement particles and drying the thus treated sponge iron pellets.

2. A method of passivating sponge iron pellets according to claim 1 wherein the wetted pellets are coated with said pulverulent mixture of iron oxide and cement particles to form a coating comprising about 0.1% to 1.0% by weight of the coated pellets.

3. A method of passivating sponge iron pellets according to claim 1 wherein said coating comprises about 0.5% by weight of said coated pellets.

4. A method of passivating sponge iron pellets according to claim 1 wherein the pellets are wetted with steam or liquid water before application of said pulverulent mixture thereto.

5. A method of passivating sponge iron pellets according to claim 1 wherein said hydraulic cement comprises by weight about 60% to 67% calcium oxide, 19% to 24% silicon dioxide, 4% to 9% aluminum oxide, up to 5% magnesium oxide, up to 3% sulfur trioxide, and 1.6 to 6% ferric oxide.

6. A method of passivating sponge iron pellets according to claim 1 wherein the treated pellets are dried with an inert gas at an elevated temperature.

7. A method of passivating sponge iron pellets according to claim 1 wherein the pellets are treated with an excess of said pulverulent mixture to form a coating thereon, the coated pellets are separated from excess pulverulent mixture and the excess mixture is used to treat a further quantity of untreated pellets.

8. A method for the passivation of sponge iron pellets comprising the steps of wetting the sponge iron pellets, contacting the wetted pellets with an effective amount of a pulverulent passivating material comprising iron oxide particles in admixture with a hydraulic cement consisting essentially of a major amount of calcium oxide and minor but substantial amounts of silicon dioxide and aluminum oxide to coat said pellets with said passivating material, separating any excess passivating material from said coated sponge iron pellets and drying the coated pellets.

9. A method according to claim 8 wherein the hydraulic cement contains by weight from about 60% to 67% calcium oxide, from about 19% to 24% silicon dioxide and from about 4% to 9% aluminum oxide.

10. A method according to claim 8 wherein said cement has an average particle size of about 0.02 to 0.05 mm.

11. A method according to claim 8 wherein said passivating material contains from 40% to 70% by weight of iron oxide.

12. A method according to claim 8 wherein separated excess passivating material is used to contact a further quantity of untreated pellets.

13. A method according to claim 8 wherein said coating comprises from about 0.1 to 1.0% by weight of the coated material.

14. A method for the passivation of sponge iron particles comprising the steps of wetting said sponge iron particles, contacting said sponge iron particles with an effective amount of a pulverulent passivating material comprising iron oxide fines in admixture with hydraulic cement containing by weight 60 to 67% calcium oxide, 19 to 24% silicon dioxide, 4 to 9% aluminum oxide, up to 5% magnesium oxide, up to 3% sulfur trioxide and 1.6 to 6% ferric oxide to coat said sponge iron particles with said passivating material, separating any excess passivating material from said coated sponge iron, and drying the coated sponge iron particles.

15. A method of passivating sponge iron pellets comprising the steps of wetting said sponge iron pellets, applying to the wetted pellets a passivating amount of a pulverulent mixture of hydraulic cement particles and iron oxide particles and drying the thus treated sponge iron pellets.

16. A passivating agent for inhibiting re-oxidation of sponge iron pellets consisting essentially of a pulverulent mixture of 40% to 70% by weight or iron oxide particles and 60% to 30% by weight of hydraulic cement particles.

17. A passivating agent according to claim 16 wherein said mixture contains 50% to 60% of iron oxide particles and 40% to 50% of cement particles.

18. A method according to claim 1 wherein said mixture contains from 50% to 60% of iron oxide particles and from 40% to 50% of cement particles.

* * * * *

UNITED STATES PATENT AND TRADEMARK OFFICE
CERTIFICATE OF CORRECTION

PATENT NO. : 4,388,116
DATED : June 14, 1983
INVENTOR(S) : David H. Carrillo-Cantu; Asdrubal Trevino-Alanis It is certified that error appears in the above—identified patent and that said Letters Patent is hereby corrected as shown below:

Column 6, line 18 (claim 16, line 3), delete "or" and insert --of--.

Signed and Sealed this

Sixteenth Day of August 1983

[SEAL]

Attest:

Attesting Officer

GERALD J. MOSSINGHOFF

Commissioner of Patents and Trademarks